United States Patent [19]

Duffy

[11] Patent Number: 4,754,342

[45] Date of Patent: Jun. 28, 1988

[54] VIDEO EDITING SYSTEM HAVING VIRTUAL MEMORY

[75] Inventor: Robert W. Duffy, San Jose, Calif.

[73] Assignee: CMX Corporation, Santa Clara, Calif.

[21] Appl. No.: 851,079

[22] Filed: Apr. 11, 1986

[51] Int. Cl.⁴ .................... H04N 5/76; G11B 27/02
[52] U.S. Cl. ................................ 360/14.3; 360/14.1;
360/33.1; 360/72.2; 358/342; 358/335
[58] Field of Search ................... 360/14.1, 14.2, 14.3,
360/33.1, 72.2; 358/342, 311, 903, 335;
369/111, 32

[56] References Cited

U.S. PATENT DOCUMENTS

| | | | |
|---|---|---|---|
| 3,721,757 | 3/1973 | Ettlinger | 360/14.1 |
| 4,538,188 | 8/1985 | Barker | 360/14.3 |
| 4,567,532 | 1/1986 | Baer | 358/342 |

OTHER PUBLICATIONS

"An Automatic Editing System . . . " by Mura et al, Journal of SMPTE, vol. 84, No. 10, pp. 781-789, Oct., 1975.

*Primary Examiner*—Alan Faber
*Attorney, Agent, or Firm*—Townsend and Townsend

[57] ABSTRACT

A virtual memory system for a video editor is disclosed which permits edited material from discrete takes to be electronically spliced in real time to form edited scenes. Typically, a plurality of cameras take film of originally acted scenes, either simultaneously from different angles or sequentially of differing takes of the same scene material replayed by skilled film actors. The film material is thereafter recorded from all uncut takes to a random access memory, preferably a DRAW laser video disk. An intelligent interface—preferably a microprocessor—connects at least two and preferably three laser disk heads for reading the video frames of the same uncut takes. Each disk head is provided with and reads the identical disk material containing identical unedited takes. An intelligent interface addresses a video disk head to randomly access the uncut takes and cause playing at controlled speeds forwardly, backwardly or still frame. A controlling computer addresses the intelligent interface and maintains and immediately updates a frame address list of edited takes including the first frame address of each take, and the last frame address of each take. All takes are maintained in the specified serial order of the edited scene. For immediate review at any time of an edited scene, the controlling computer commands the intellignet interface to play the current edited take and positions one player on the first frame of the next sequential take—this frame being the first frame of the next take in forward motion or the last frame of the previous take for reverse motion.

13 Claims, 5 Drawing Sheets

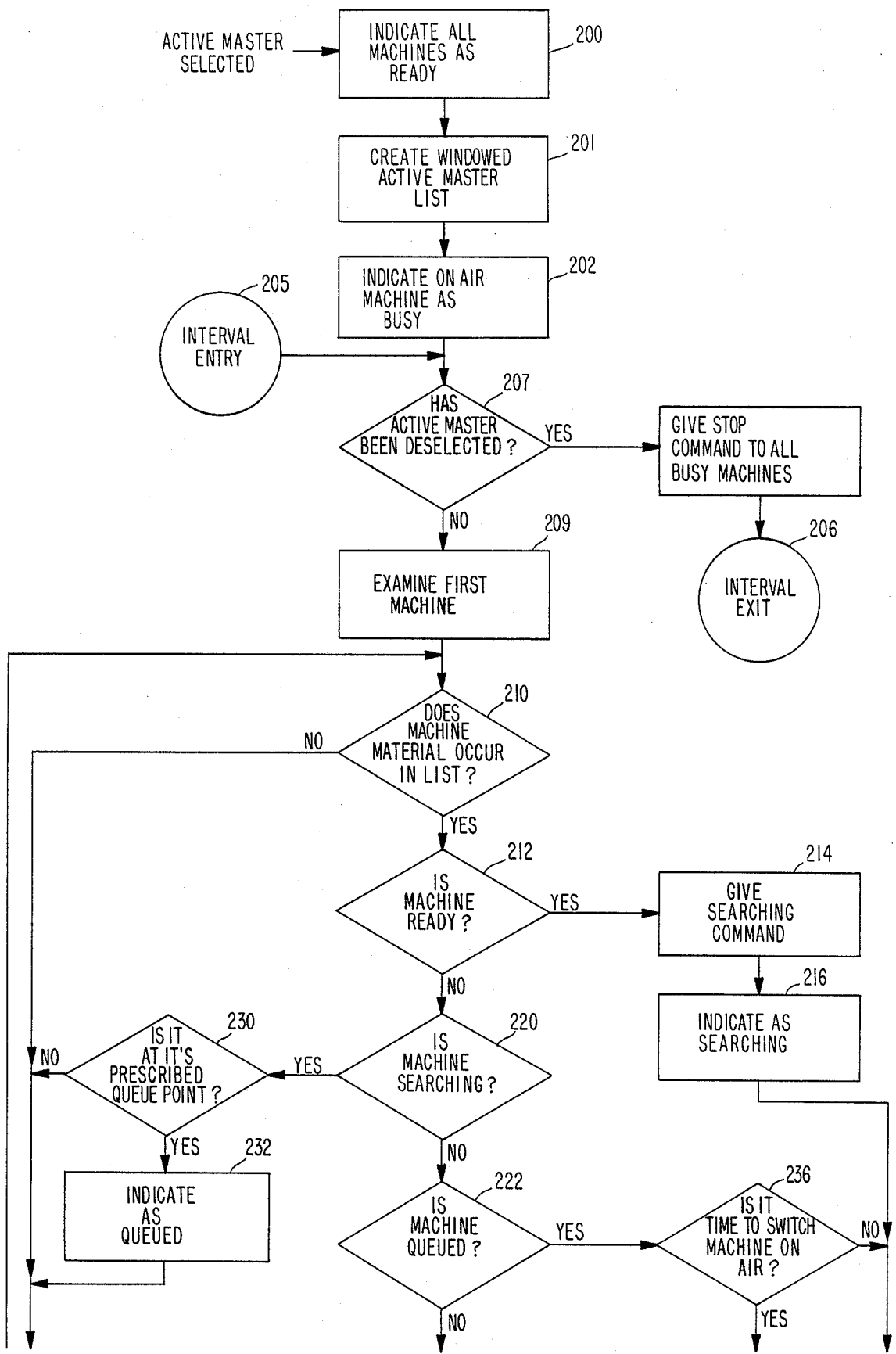
FIG. 3 (1 OF 2)

(2 OF 2)

VIDEO EDITING SYSTEM HAVING VIRTUAL MEMORY

BACKGROUND OF THE INVENTION

This invention relates to the editing of either video or film. More particularly an editor is disclosed using random access memories, such as disk drives. A virtual memory system for the video editor is set forth which enables immediate forward action motion, reverse action motion and stop frame review. Correlation of the video edit to actual film edit is disclosed.

SUMMARY OF THE RELEVANT LITERATURE

Ettlinger U.S. Pat. No. 3,721,757 discloses the playing of video information utilizing random access memories.

Further, a commercial product was made and produced utilizing the embodiment of the Ettlinger '757 patent and vended under the trademark CMX 600 by the CMX Corporation of Sunnyvale, Calif.

Video editors such as the CMX 3400A are known. Typically, such video editors edit discrete takes and build the edited takes to an edited scene on master magnetic tape. Motion in the forward and reverse mode requires building of a video master. Unfortunately, building of a video master is not without delay and difficulty.

Where a so-called "Master" is constructed, the edited takes are serially played and recorded to a so-called "Master Tape." Where a master tape has a take changed there is a "ripple effect" on re-edit on the magnetic master tape. Typically, where a take of a scene is changed in length and the scene (having many takes) has been recorded to a master tape, at least a portion of the master tape must be recorded again. Typically, this recording must occur from the altered take to the end of the tape in real time. The result is a long delay.

Laser disks drives are known in which a laser writes to a disk and the disk is thereafter accessed by a random access disk drive.

Film editing remains traditionally labor intensive. The process of constructing from work prints the sequence of prints for release includes not only the artistic input of a film editor but additionally the complication of film splicing at the time of the artistic edit input.

The reader will understand that the words "take" and "scene" are arbitrarily selected. Naturally the disclosed editor can be used for edits of many lengths so long as the random access memory capacity of the present system is not exceeded.

SUMMARY OF THE INVENTION

A virtual memory system for a video editor is disclosed which permits edited material from discrete takes to be electronically spliced in real time to form edited scenes. Typically, a plurality of cameras take film of originally acted scenes, either simultaneously from different angles or sequentially of differing takes of the same scene material replayed by skilled film actors. The film material is thereafter recorded from all uncut takes to a random access memory, preferably a DRAW laser video disk. An intelligent interface—preferably a microprocessor—connects at least two and preferably three laser disks heads for reading the video frames of the same uncut takes. Each disk head is provided with and reads the identical disk material containing identical unedited takes. An intelligent interface addresses a video disk head to randomly access the uncut takes and cause playing at controlled speeds forwardly, backwardly or still frame. A controlling computer addresses the intelligent interface and maintains and immediately updates a frame address list of edited takes including the first frame address of each take, and the last frame address of each take. All takes are maintained in the specified serial order of the edited scene. For immediate review at any time of an edited scene, the controlling computer commands the intelligent interface to play the current edited take and positions one player on the first frame of the next sequential take—this frame being the first frame of the next take in forward motion or the last frame of the previous take for reverse motion. Consequently, the computer through a connected controller can electronically edit and immediately thereafter replay in real time the edited takes as if a compiled and spliced film were being made in real time with the system. Provision is made to take the finally edited frame list and in two steps construct an assembled work or final print. First each film reel is run through a film synchronizer and stopped responsive to frame address signals to remove from the film precisely the edits takes. Thereafter, and once the takes are removed from all film, the virtual memory edit list is used to assemble the takes in their now specified order. Thus a fully edited work print or final print may be constructed utilizing the video edited virtual memory list.

OTHER OBJECTS AND ADVANTAGES

It is an object of this invention to disclose a virtual memory scheme enabling playback of a series of edited takes in any direction, at variable speed so that the performance of a work print fully spliced is electronically emulated. Unedited takes are recorded to random access video memories, preferably laser video disks. Computer controlled heads read the random access memories at discrete frame addresses of the unedited takes. The computer builds an edited take list for an edited scene including maintaining a list of addresses of all component takes to a edited scene. The list of addresses for the component takes includes the address of the first frame in any edited take and the address of the last frame in any edited take. The edited take addresses are compiled and maintained in the desired serial order to create an edited scene. The heads read the scene with one disk drive positioned to the first frame address of the next edited take and one disk drive playing the currently played edited take. By outputting the head frames to a monitor and switching the video under computer control, replay in forward motion, reverse motion and still framing can result.

An advantage of the disclosed virtual memory technique is that a disk control protocol is disclosed which enables a video edit to replay in the same manner as spliced film. Forward motion, backward motion and still frame is disclosed. For the first time, video editing with effectively instantaneous electronic splicing is the same in replay as film editing. However, the laborious task of physical film splicing is omitted from the artistic editing environment. Full attention to artistic input is gained.

A further advantage is that the disclosed technique leaves a video address list which can be easily correlated to film frame addresses. The technique produces an electronic "work print" which may be easily converted to a real work print by non-artistic film assistants.

A further object of this invention is to disclose an electronic aid of collating the developed virtual master to real world film editing. A process of editing is disclosed wherein uncut film is developed and thereafter recorded to a random access memory, preferably a DRAW laser video disk media. The recorded random access memory is read by a plurality of random access heads. A controlling computer creates a virtual master list of addresses from the unedited takes to edited takes in operator specified serial order to create the ultimately edited scene. At the completion of the edited scene, a frame list is developed. Thereafter, work prints and/or the final master prints are physically cut from the beginning and ending edited take addresses and spliced in the specified serial order pursuant to computer controlled counter derived signals of the frame location on the film.

An advantage of this aspect of the invention is no longer is editing part physical and part artistic. Full efforts can be devoted to the artistic input of film editing; splicing of work prints can be completely avoided until a virtual memory list is developed.

An advantage of this system is that splicing is delayed. Edited scenes can be replayed and altered without splicing. The total amount of splicing required for film assembly by assistants is held to a minimum.

Finally, splicing when it does occur, is done with an electronic aid. The possibility of error is held to a minimum.

A further advantage is that when the electronic splicing is completed, the created virtual master can be cross checked to the actual film master.

BRIEF DESCRIPTION OF THE DRAWINGS

Other objects, features and advantages of this invention may be determined after referring to the following specification and attached drawings in which.

DESCRIPTION OF PREFERRED EMBODIMENTS

Figure 1A:
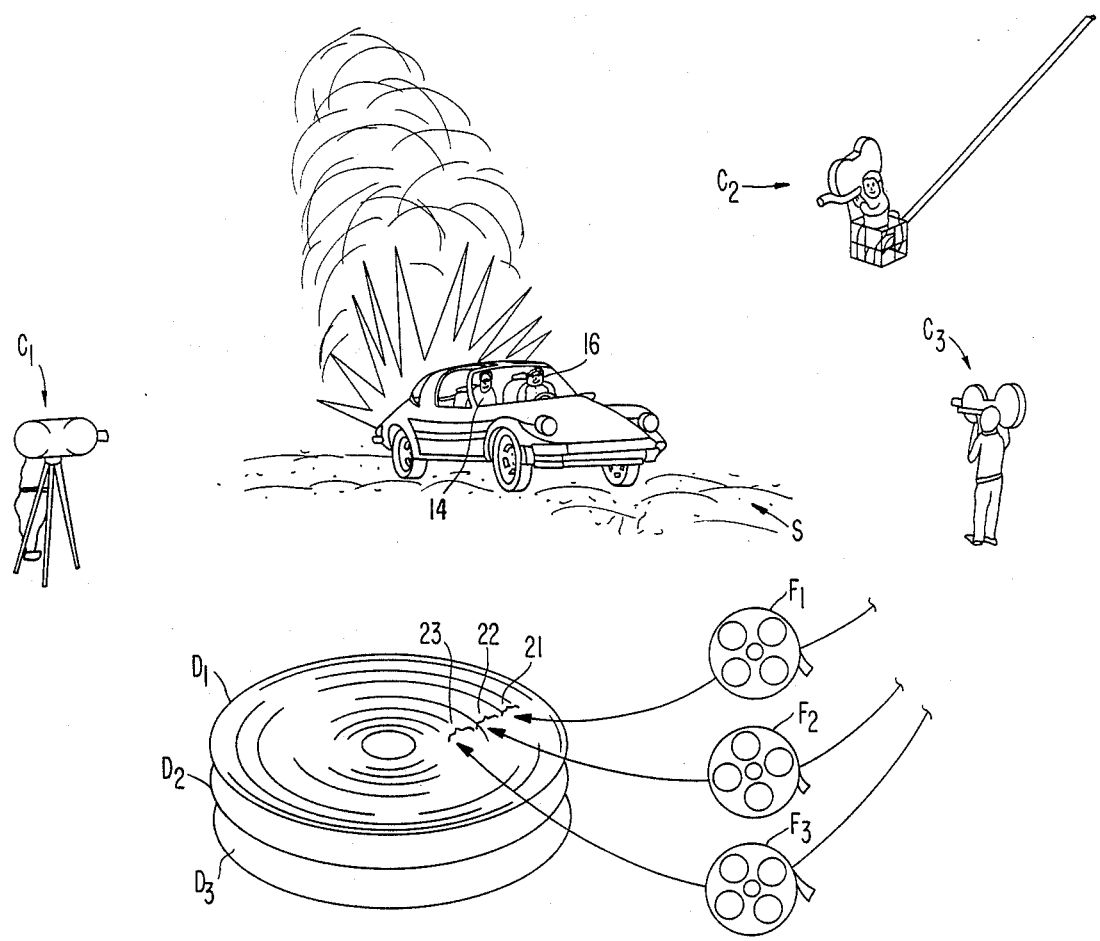
FIG. 1 is a schematic view illustrating three cameras having takes of a scene with the film being removed, developed and played to a DRAW video disk, there being preferably created three disks of identical, uncut film information.
FIG. 1B is a schematic illustrating takes assembled to make A scene.

Referring to FIG. 1A, three cameras, C1, C2, and C3, are each shown filming a scene S. The cameras here utilized are film-type cameras. It will be understood that with the virtual memory technique herein disclosed, the cameras may as well be video cameras.

As here shown, the three cameras are taking pictures of scene S and actors 14, 16 in a car from three different angles. This is common in some video and movie productions. It will be understood that the technique herein can apply to separate edited "takes" of the same scene material replayed by skilled film actors. Thus, the disclosed technique may be utilized where different cameras take pictures of the same scene simultaneously or the same scene is repeated by actors in discrete and separate takes and thereafter portions of each of the takes are utilized to form a final scene for a film.

As herein disclosed, film from each of the cameras, C1, C2 and C3, is developed at reels F1, F2, and F3. Thereafter, the reels of film are played via applicable video equipment to a video disk D1.

Video disk D1 is typically of the DRAW variety. It is known in the prior art to have a Direct Read After Write laser written disk so that material written to a video disk is immediately checked for parity by reading the video disk immediately after writing. As here illustrated, all three reels of film F1, F2, and F3 are written to respective corresponding sections 21, 22, 23 of a disk D1. Preferably, three such disks are made, these disks being illustrated at D1, D2, and D3. It will be understood that disks D1, D2, and D3 are identical and all contain the same video information in the same sequence.

Figure 1B:
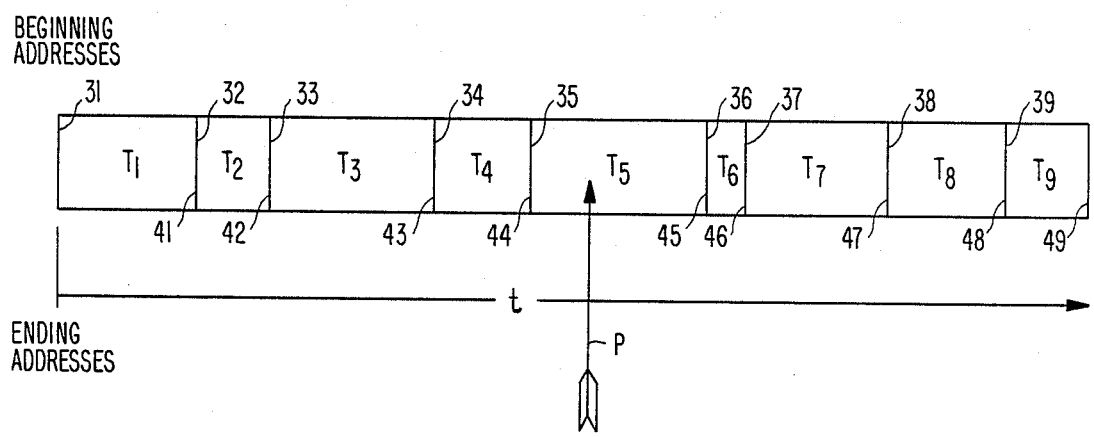

To understand the problems of constructing a scene S from a series of takes, reference may be had to FIG. 1B.

In FIG. 1B, the virtual memory address list of this invention is schematically illustrated. Typically, a series of nine takes T1-T9 are illustrated. The address list comprised of each of the takes T1-T9 will include the address of the beginning frame 31-39 and the address of the ending frame 41-49. A player pointer P is shown pointing to scene 5. Stopping here, a summary of the virtual memory aspect of this invention can be provided.

Each of the edited takes is defined as to beginning address and ending address as set forth in the prior art. See Ettlinger U.S. Pat. No. 3,721,757. In this disclosure it is the method and apparatus for replay which differs from the prior art.

Simply stated, in reviewing the virtual memory list, one disk player will be playing take T5. If the scene is being played in the conventional and forward direction, the remaining disk drive will be positioned at frame address 36 of take T6.

Alternately, if the virtual memory list is being played backwardly, the remaining disk drive will be positioned at ending frame address 44 of take T4.

In either event, once take T5 is completed in its play to either its end frame address 45 or its begin frame address 35, the standby random access player will be positioned immediately to come on line and play the next take (T6 in forward motion, T4 in reverse motion). The end result is to produce electronically an analog in video that is the same as a spliced work print.

As will hereinafter appear, it is preferred to have the apparatus of this invention utilizing three disk players. In this case, and to accommodate reversal, a player completing play is left positioned on the last frame address of the previous take. Thus, referring to FIG. 1A, and presuming scene play in the forward direction, the last active player would be left at address 44 in take T4. Thus, if a reversal is encountered, at least one idle disk drive will be immediately prepared to play the next desired take.

For ease of understanding, separate disks each reading separate and identical laser disks D have been illustrated. However, it is preferred to have a single disk read by multiple random access heads.

Figure 2:
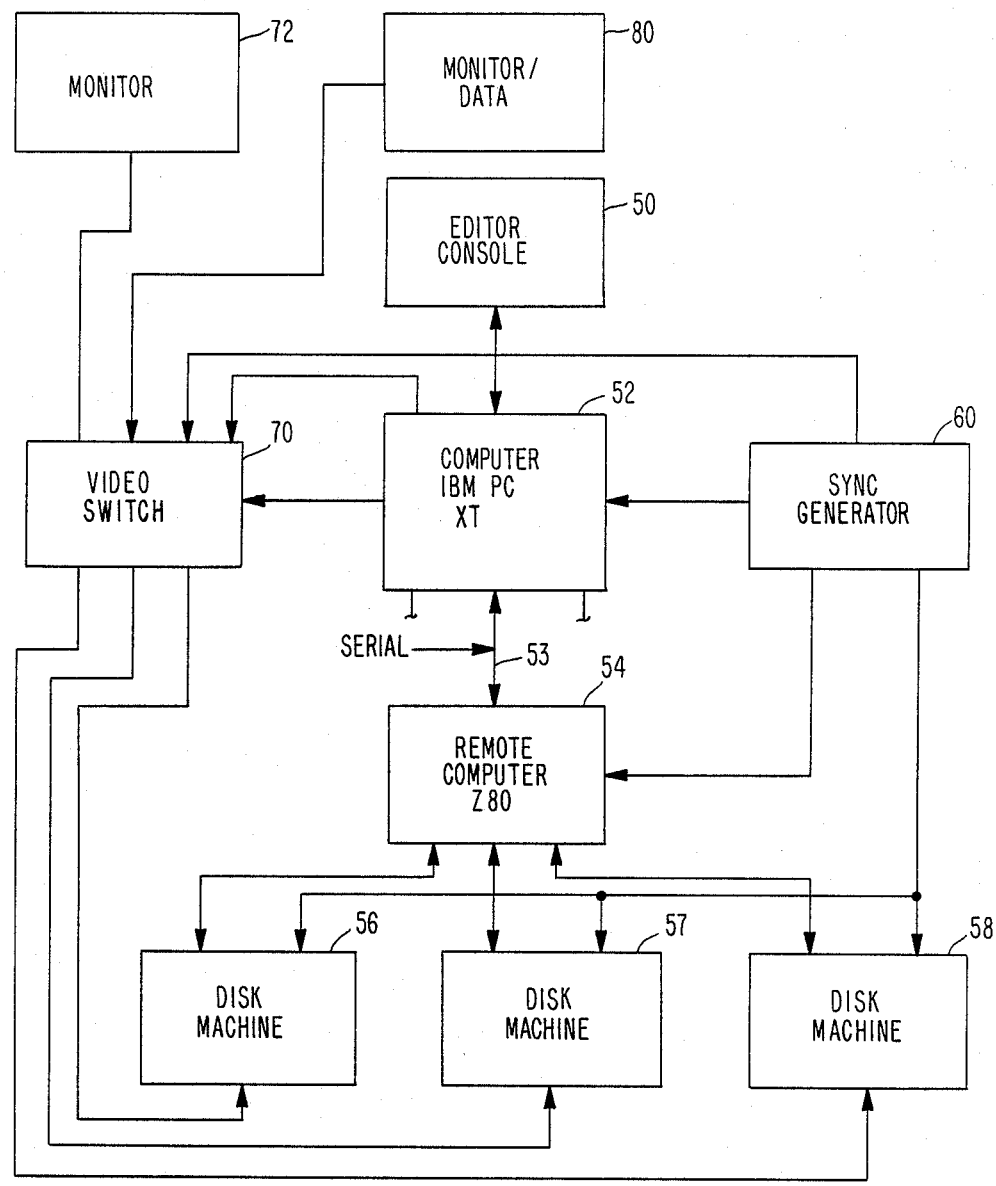
FIG. 2 is a block schematic of hardware utilized with this invention.

Having set forth the theory of operation, a hardware schematic of the disclosed invention can be set forth with respect to FIG. 2.

Referring to FIG. 2, an editor's console 50 communicates to a computer 52. For example, as here illustrated, computer 52 is an IBM PC XT. Software is filed concurrently herewith for the operation of a computer utilizing an IBM PC XT.

Preferably, the disclosed computer 52 communicates to an intelligent interface 54 using and 8-bit protocol. Intelligent interface 54 can be a Z80 microprocessor manufactured by Zylog Incorporated of Sunnyvale, Calif.

The Z80 intelligent interface 54 communicates to the IBM PC over an RS422 bus 53. It generates standard control commands utilized by the player. For example a Pioneer disk drive sold under the trademark LDV6000 manufactured by the Pioneer Company of Tokyo, Japan. Standard commands—still, slow speeds, play speed, 2× play, 3× play, scan, search, frame address, search complete, busy searching are utilized.

In the prototype program here filed, the IBM PC XT computer directly controls Pioneer LDV 6000 Laser Disk Drives. The reader will understand that an intelligent interface will be preferred, especially when two sound tracks as well as the video information is recorded and edited in the same device.

As the programming of the Zylog Z80 to issue the standard commands received by the disk drive is well known to those having skill in the art, such will not be repeated here. It can be stated that by utilizing standard microcomputer and microprocessor commands as set forth in the book entitled *Microcomputers and Microprocessors* by John Uffenbeck, published by Prentice-Hall, Inc. of Inglewood Cliffs, NJ in 1985 will enable a moderately skilled technician to construct intelligent interface 54.

As illustrated in FIG. 2, three disk heads, here shown in separate drives 56, 57, 58 are utilized. However, the reader will understand that only two such disk heads are required, although three are preferred.

A video switch 70 under the control of the computer 52 outputs to two monitors 72, 80. Such a switcher and control is adequately described and set forth in Ettlinger U.S. Pat. No. 3,721,757. Typically, these respective monitors can be utilized for playing and editing of the individual take (as in the case of monitor 72) and playing back the virtual master (as in the case of monitor 80). Additionally, monitors 72, 80 will be used for data display of the virtual memory list and applicable alpha-numeric comment to assist editing.

Figures 5A, 5B:
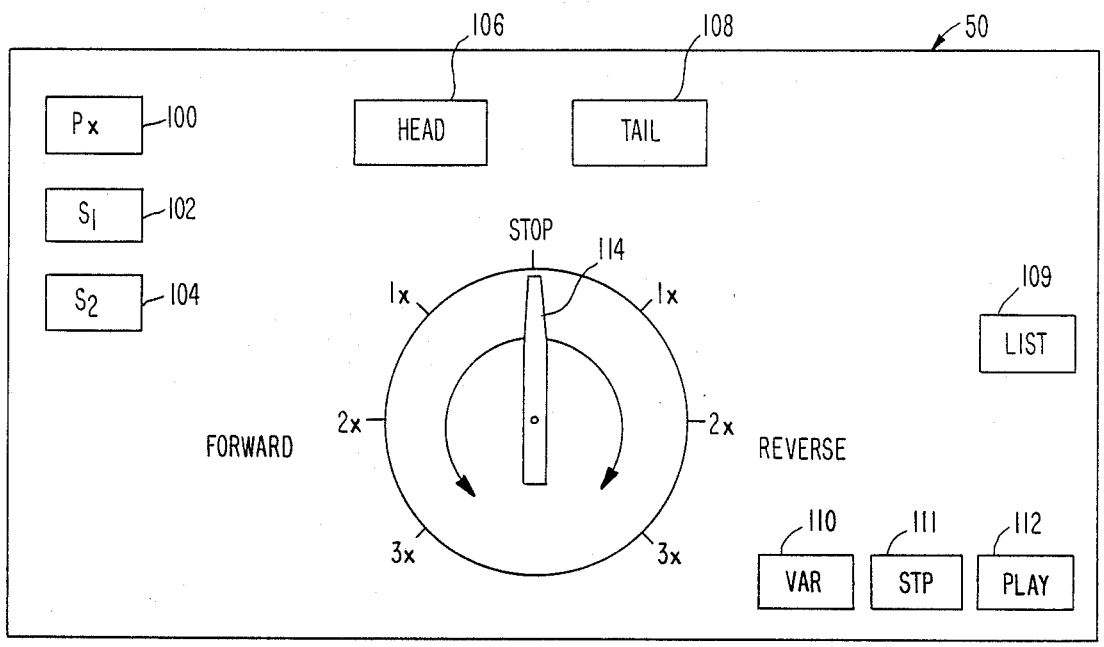
FIG. 5A is a schematic of a system controller.
FIG. 5B is a schematic of one monitor used for data display.

It is desirable to display the resulting virtual list of addresses. Such a display may be output from the computer on a conventional CRT display monitor 80. Monitor 80 is typically shared between scene edit and data display. As shown in FIG. 5B, monitor 80 is shown with a typical data display.

The schematic illustrated in FIG. 2 may preferably include nine disk drives and three intelligent interfaces 54. The intelligent interfaces 54 would address up to three disk drives each.

Typically, the first three disk drives would be utilized for editing picture information. The second three disk drives would be used for editing a first sound track and the third three disk drives would be used for editing a second sound track. Thus, three independent virtual memory lists as illustrated in FIG. 1B would be created. Since the editing of the sound list is in many respects similar to the editing of the picture information, the example of pictures only will be set forth herein. Stubs for such connection are schematically illustrated on computer 52.

Referring to FIG. 5A, the control console is illustrated. Specifically, a select button 100 is shown depressed for selecting editing of the video information. Sound tracks edit selects 102 and 104 are not selected in the operative example set forth.

A type of controller is illustrated. Typically, a potentiometer (not shown) provides an impedance output that enables, via a conventional analog to digital converter, video review at variable speeds. Speeds are provided in a continuum from three times forward the normal rate to three times reverse the normal rate with a still frame or stop position therebetween.

Control buttons 106 and 108 "instantly" transport view to the beginning and end of an edited take. These controls are used to conventionally view the beginning and ending frames of a take T.

A readout is shown on monitor 80 in FIG. 5B including an address list. Typically the address list of FIG. 1B would be displayed at 120 in a vertical format. Adjacent the address list 120 is an area 122 for displaying alpha-numeric output. Typically, a computer keyboard will enter alpha-numerics descriptive of each component take of an edit scene. As is known in the computer art, printouts and electromagnetic recordings of the developed edit list can be made.

Having set forth the schematic of the hardware, the programmed loop run on computer 52 can now be set forth. This programmed loop assumes that three drives 56, 57 and 58 are being simultaneously run. The reader will understand that this invention will work with two drives. Indication will be made to the logic diagram of FIG. 3 where changes should be made to include operation with two drives only.

Additionally, those using the concurrently filed software will discover that the software is written for only two drives. Because of required disk head access time, three drives are preferred. However, software controlling three drives does not exist and is here set forth in logic outline only.

Figure 3:
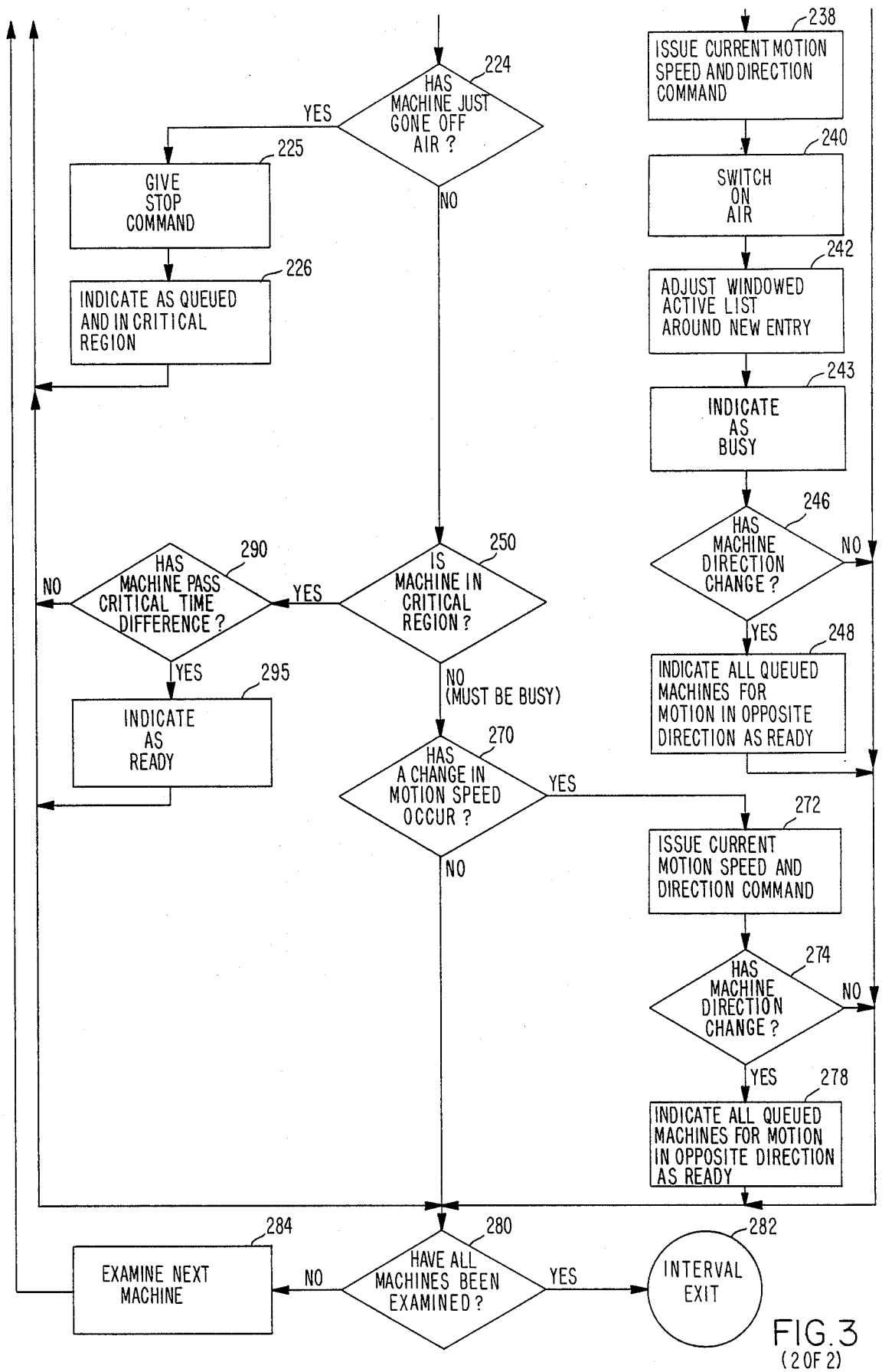
FIG. 3 is a logic schematic of a computer program for playing the virtual memory addresses required with this invention.

Referring to FIG. 3, a logic diagram illustrating operation of a computer program suitable for use with this invention is shown. Typically, and upon initialization, all machines are indicated as ready. Depending upon where initialization occurs, an active master list of edited takes is created. For example, such a list may include the take being played and a list of seven sequential takes in the forward direction and seven sequential takes in the reverse direction. This would constitute an address list similar to that shown in FIG. 1B.

Creation of the master list of edited takes occurs in the manner set forth in Ettlinger U.S. Pat. No. 3,721,757.

The reader will realize that the editor here disclosed can do many prior art tasks. For brevity, a specific description is omitted (see Ettlinger U.S. Pat. No. 3,721,757). However, the possibility does exist that one or more of the disclosed disk drives 56, 57, 58 could be "on air" executing such a task. Therefore, in the initialization here described all machines on air would be indicated as busy. That is to say, if disk drive 57 in FIG.

2 were busy functioning in a discretely assigned capacity outside of the real time review herein set forth, only drives 56 and 58 would be indicated as not in the busy state.

Referring to FIG. 3 it can be seen that a conditionally branching loop with logic steps is illustrated. This loop is cycled at each frame for each disk drive. That is to say, assuming that three drives are present, interrogation of all three drives 56–58 will occur at each frame according to the logic set forth in the loop. In interrogating the drives, entry will be made into the loop at 205. Presuming that display is to be stopped, exit will be made at 206, as the active master will have been deselected at conditional branch 207. Assuming that neither of these special conditions is present, the logic of the illustrated loop may be discussed.

Each machine will be examined in order. Taking the case where drives 56 and 58 are idle and 57 is playing, let us assume that drive 56 is being examined.

Assuming that drive 56 is being examined, its vocabulary of addressable material will be queried at conditional branch 210. Assuming that the drive contains addressable material which is a candidate for view, the answer will pass to the is the machine ready conditional branch at 212. If the machine does not have material appearing in the edit list, the loop would be completed and examination of the next machine would occur.

Assuming that drive 56 is not positioned to the leading frame 36 of take T6, and drive 56 is otherwise ready two conditional branches will be executed. First, a conditional branch 210 will indicate the machine as ready for search. Secondly, at step 214 the machine will be given its specific search assignment. The drive through the intelligent interface 54 will be indicated as searching at step 216. The loop will proceed to the next machine through step 294 to examine the next machine.

Drive 57 will be next examined by the loop. As will be remembered, it is a playing machine and indicated as on air and busy. Drive 57 will be indicated at respective conditional branches as not ready 212, not searching 220, not queued 222, not off the air 224, not in a critical region 250, and therefore busy (playing the current information). It will be examined at respective conditional branches for speed change 272, and direction change 274. Assuming no speed change or direction change, the next in order drive will be examined.

Drive 58 will be next examined. For the purpose of this example, it will be assumed that drive 58 has stopped at the last frame at address 44 of take 4. In this case, the drive will be indicated at respective conditional branches as having material in the list 210, not being ready 212, not searching 220, not queued 222, and queued in a critical region 250. The critical region to which it is queued will be frame 44 of take T4.

In the three drive preferred embodiment, it will be necessary to determine when it is no longer a priority to leave a drive departing a scene at the last played frame address of the previously played edited take. Accordingly, at conditional branch 290, the interval of departure from the last scene is examined. Assuming the interval is exceeded, the drive is indicated as ready at step 295.

Again, the reader will realize that in the two machine embodiment, the logic 290, 295 will be omitted.

At a subsequent loop for a subsequent frame, drive 56 will arrive at its searched address. Upon arrival at its searched address, the query as to whether the machine is queued will be stopped at conditional branch 230 and indicated as queued at step 232.

When the drive 56 is indicated as queued at 222, it will be constantly reviewed until it is time to switch the machine on the air. This review will occur at conditional branches 222 and 236.

Referring to the logic of FIG. 1A, that is to say when the on air drive 57 arrives at address 45 of take T5, drive 56 will be queued to begin playing at address 36 of take T6.

Assuming that it is time to switch the machine on air, condition branch 236 will divert the loop to the going on air steps 238, 240, 243. The machine will be given current motion speed and direction command 238, switched on air 240, the active window list adjusted 243 (see FIG. 1B), and the drive indicated as busy.

There is a special case which can be encountered. Direction change could be called for at the first frame of a scene. In order to timely serve this direction change conditional branch 246 and step 248 effect immediate notification to all drives of motion in the opposite direction.

It will be recalled that it is required that the virtual memory list here disclosed enable playing of the video information in either direction. Assuming direction has not changed, no adjustments need be made. However, if direction has changed, all queued machines having an address corresponding to the new address list will be indicated as cued.

An example can make this clear. It will be remembered that in the logic herein set forth, drive 57 has stopped. Since it is assumed that drive 57 played to the end of take T5 at out address 45, drive 57 stopped at address 45. It will be apparent that the drive is not cued to an address, provided that playing does not reverse. Where playing does reverse, it will be realized that drive 57 having stopped on address 45 of take T5 will, in fact, be cued.

Drive 57 eventually will no longer be at a relevant address, especially when T6 is nearly complete in play. Logic 290 will examine for this relevant time interval and indicate drive 57 as being available for search at step 295 when the relevant time interval has passed.

Continuing on, and remembering that drive 56 is now playing the material of take T6, assuming that all logic through conditional branch 250 is passed, it will be noted that a machine "must be busy" when logic 270 is reached. This is because the conditional branching loop will have examined the drive being queried for all other possible states. The being busy state—through the process of elimination—will be the only state remaining.

Conditional branch 270 is for the purpose of detecting generically whether a change in motion command has been issued. Specifically, if that is the case, the drive is made to operate at the correct speed at step 272. Presuming that the change in motion branch includes a change in direction, a condition branch 274 will issue the direction change order and step 278 (similar to step 248) will indicate to all cued machines, queuing for review of the edited takes in the opposite direction.

Once all machines have been examined at 280, exit to the next interval at 282 will occur. The next interval will be the next frame. Otherwise, looping will occur at 284 until for each frame all machines have, in fact, been examined.

It can thus be seen with respect to the logic diagram of FIG. 3 that a rapid play loop for the control disk drives is illustrated. The output of the logic will require a played machine and a cued machine. The cued machine will be cued to the beginning address of the frame of the next scene. This beginning address will be the beginning frame of the next scene if play in the forward direction occurs and the last address of the previous scene if play in the reverse direction occurs.

Once the edit in accordance with this invention has been optimized, there will remain an edit list including the first frame address of each edited take T and the last frame address of each edited take T. Where film is the original media, it will now be shown that the resultant edit list through a simple shaft counter, preferably of the optical variety, can assist required splicing.

Figure 4:
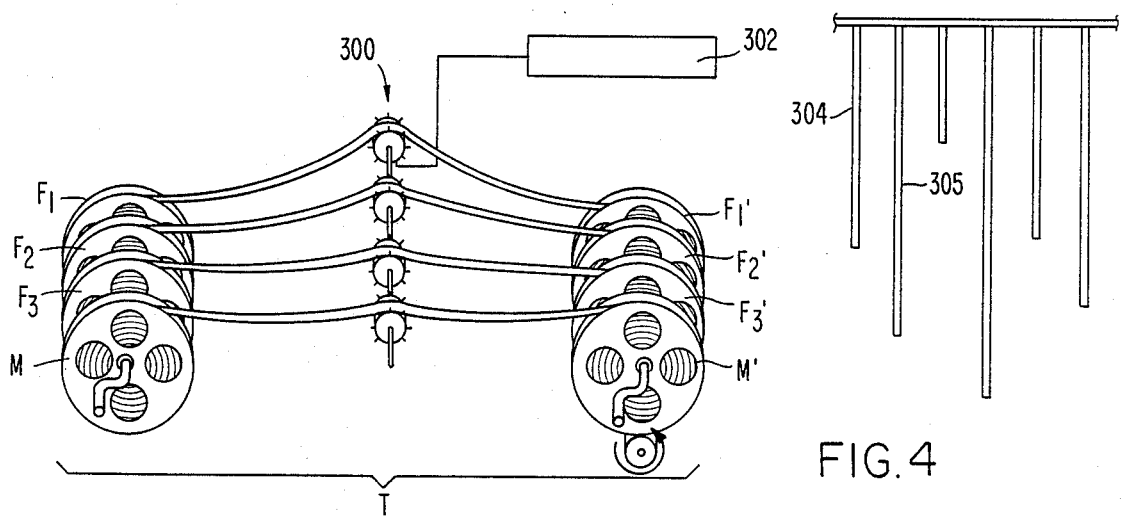
FIG. 4 is a diagram of a film synchronizer having attached counters with the film from three cameras being cut to form edited takes from which a master responsive to the virtual memory list of FIG. 2 may be assembled.

Referring to FIG. 4 a film synchronizer T is schematically illustrated. The film synchronizer includes the film from each of the unedited takes of the scene shown in FIG. 1A in reels F1, F2, and F3 being wound across film syncronizer 300 to respective take up reels F1', F2', and F3'. An optical counter 302 affixed to the film synchronizer will emit a discernible signal for the beginning frame address of an edited take and the ending frame address of an edited take. Address information is conventionally supplied through a computer connection, not shown. Common computer classification of the edited takes on each reel F1, F2, F3 will occur. The edited takes may be conventionally stored as at 304, 305.

As the respective film frames pass over the synchronizer 300, the film will be cut at the frame addresses.

Once the edited takes are cut from all three reels F1, F2, and F3, splicing of the cut edited takes is conducted in the order specified by the virtual memory list. The spliced film master from takes 304, 305 is then wound to reels M, M'. There results a work print or master print which is frame addressed to the virtual master created as indicated in FIG. 1B. This work or master print may be used for further processing as is common in the applicable industry standard.

The reader will understand that I have assumed, without discussion, that conversion from film rates—24 frames per second—to TV transmission frame rates—30 frames per second—are made. Where film is used, appreciation of the well known "3 to 2 pull down" will be required. Since such conversions, including conversion of discrete frame addresses to and from the applicable TV media to the applicable film or movie media, are well within ordinary skill, they will not be set forth here.

I have shown multiple disk drives. Those having skill in the art will realize this description includes a single disk drive having multiple read heads and associated electronics.

Additionally, because of disk head access time, where scenes are short relative to access time, a buffer may be required. Such a buffer is shown in Ettlinger U.S. Pat. No. 3,721,757.

What is claimed is:

1. A process of editing uncut takes of an acted scene to a series of edited takes arranged in serial order to comprise an edited scene, said process comprising the steps of:
    recording said acted scene from a plurality of views into discrete frames having discrete frame addresses;
    placing said plurality of views on media for random access, said views on each said media all including identical discrete frame addresses for each frame of said views on said media;
    reading and editing takes on said random access media by recording the beginning address of each edited take and the ending address of each edited take;
    placing said beginning and ending addresses of each said edited take in serial order in a memory to compile a list of addresses of an edited scene;
    playing said edited scene on one of a plurality of reading means with one reading means playing an edited take;
    positioning for play on the other of said reading means;
    said positioning step including placing the other of said reading means at the beginning address of the following adjacent take when said scene is in forward motion or the ending address of the previously adjacent take when said take is played in the reverse direction; and,
    reviewing said edited scene forward motion and backward motion whereby said reading means plays an electrical analog of said edited scene in respective forward and backward motion.

2. The process of claim 1 and wherein said recording step includes recording the same acted scenes from a plurality of views.

3. The process of claim 1 and wherein said recording step includes recording said acted scene from different takes of the same scene acted again.

4. The process of claim 1 and wherein said placing step includes placing said plurality of views on disk media for random access and said reading and editing step includes recording the beginning address of each edited take and the ending address of each edited take on random access disk media.

5. The process of claim 1 and wherein playing said edited scene includes utilizing at least one random access disk drive having at least one reading means and said positioning step includes positioning a second reading means.

6. The process of claim 5 and wherein said positioning step includes positioning reading means on another random access disk drive.

7. The process of claim 1 and wherein said reviewing includes reviewing in forward motion and reverse motion at variable speed.

8. The process of claim 1 and wherein said reviewing step includes still framing said motion.

9. Apparatus for editing uncut takes of an acted scene to a series of edited takes arranged in serial order to comprise an edited scene, said apparatus comprising:
    first and second random access reading means for reading first and second random access memories having pictorial frame information and address information for said frames thereon;
    at least one random access memory, each said memory including uncut takes of an acted scene in frame format, said uncut takes of said acted scene on each random access media all including discrete identical frame addresses for each frame of said uncut takes;
    means for reading and recording the beginning address of edited takes on said random access memory media and the ending address of edited takes on said random access memory media;
    memory means for maintaining a list of said edited takes in serial order, said list indicating the beginning address and ending address of each said take with said addresses placed in serial order to compile addresses of an edited scene;

monitor means for playing and displaying an edited scene at an edited take from one of said reading means;

means for positioning the other of said reading means either at the beginning address of the following adjacent take when said scene is played in the forward direction or at the ending address of the previous adjacent take when said scene is played in the reverse direction;

means for reversing the direction of said reading means for forward motion and reverse motion; and switching means operatively connected to said memory means for displaying first reading means at said monitor between said respective beginning and ending address of a played, edited take and said second reading means beginning at a respective beginning address of a following edited take for forward scene motion and at an ending address of a previous edited take for reverse scene motion, whereby an electrical analog of spliced film is emulated.

10. The invention of claim 9, and where said first and second random access reading means includes first and second random access disk drives.

11. The invention of claim 9 and including two random access memories, each said random access memories including acted scenes in frame format in identical location.

12. The apparatus of claim 9 and including means connected to said monitor means for displaying said list of edited takes.

13. The invention of claim 9 and wherein said reversing means includes a control having a continuum of speeds between forward and reverse with stop motion therebetween.

* * * * *